United States Patent
Kudo

(10) Patent No.: US 8,169,641 B2
(45) Date of Patent: May 1, 2012

(54) SERVERS AND COMPUTER READABLE MEDIA, METHODS, AND SYSTEMS INCLUDING OR EMPLOYING SERVERS TO PERFORM ONE-TO-ONE COMMUNICATION BETWEEN DEVICES ON DIFFERENT NETWORKS

(75) Inventor: Yasuhiro Kudo, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1257 days.

(21) Appl. No.: 11/534,954

(22) Filed: Sep. 25, 2006

(65) Prior Publication Data

US 2007/0076250 A1    Apr. 5, 2007

(30) Foreign Application Priority Data

Sep. 30, 2005  (JP) .................. 2005-286517

(51) Int. Cl.
  *G06F 3/12*    (2006.01)
  *G06F 15/16*   (2006.01)
(52) U.S. Cl. ..................... 358/1.15; 709/219
(58) Field of Classification Search .............. 358/1.1, 358/1.9, 1.13, 1.15, 474; 709/219, 223, 228, 709/238; 370/254, 255, 256, 257, 258, 337, 370/382
See application file for complete search history.

(56) References Cited

U.S. PATENT DOCUMENTS

| 7,009,941 | B1 | 3/2006 | Uchino |
| 2002/0156947 | A1 | 10/2002 | Nishio |
| 2003/0079144 | A1* | 4/2003 | Kakemizu et al. ............ 713/200 |
| 2004/0243697 | A1 | 12/2004 | Otsuka et al. |
| 2005/0053016 | A1 | 3/2005 | Kawai et al. |
| 2006/0010321 | A1* | 1/2006 | Nakamura et al. ............ 713/168 |

FOREIGN PATENT DOCUMENTS

| JP | 2000353143 A | 12/2000 |
| JP | 2001-223730 A | 8/2001 |
| JP | 2003006133 A | 1/2003 |
| JP | 2004005553 A | 1/2004 |

(Continued)

OTHER PUBLICATIONS

Japanese Patent Office, Notification of Reasons of Rejection for Japanese Application No. 2005-286517 (counterpart to above-captioned U.S. patent application), dispatched on Jun. 3, 2008.

Japanese Patent Office, Decision of Rejection for Japanese Patent Application No. 2005-286517 (counterpart of above-captioned U.S. patent application), dispatched Oct. 7, 2008.

(Continued)

*Primary Examiner* — Gabriel Garcia
(74) *Attorney, Agent, or Firm* — Baker Botts L.L.P.

(57) ABSTRACT

There is provided a server provided in a network system in which a router intervenes between different networks to allow at least one device on the different networks to perform one-to-one communication. The server comprises a first device information acquisition unit configured to perform one-to-one communication with a device on another network connected to its own network via the router to acquire device information on the device on another network, and to store the acquired device information in a storage unit, and a device information reply unit configured such that in response to receipt of a search packet searching for device information transmitted in a form of one-to-many communication from a device on the server's network, the device information reply unit extracts the device information matching a search criterion contained in the search packet from the storage unit and returns the extracted device information to the device which transmitted the search packet.

11 Claims, 13 Drawing Sheets

FOREIGN PATENT DOCUMENTS

| | | |
|---|---|---|
| JP | 2004-080130 A | 3/2004 |
| JP | 2004-158966 A | 6/2004 |
| JP | 2004355399 A | 12/2004 |
| JP | 2004357047 A | 12/2004 |
| JP | 2005-184234 A | 7/2005 |

OTHER PUBLICATIONS

Japan Patent Office, Notification of Reasons for Rejection for Japanese Patent Application No. 2008-312298 (counterpart to above-captioned patent application), dispatched Jul. 12, 2011.

* cited by examiner

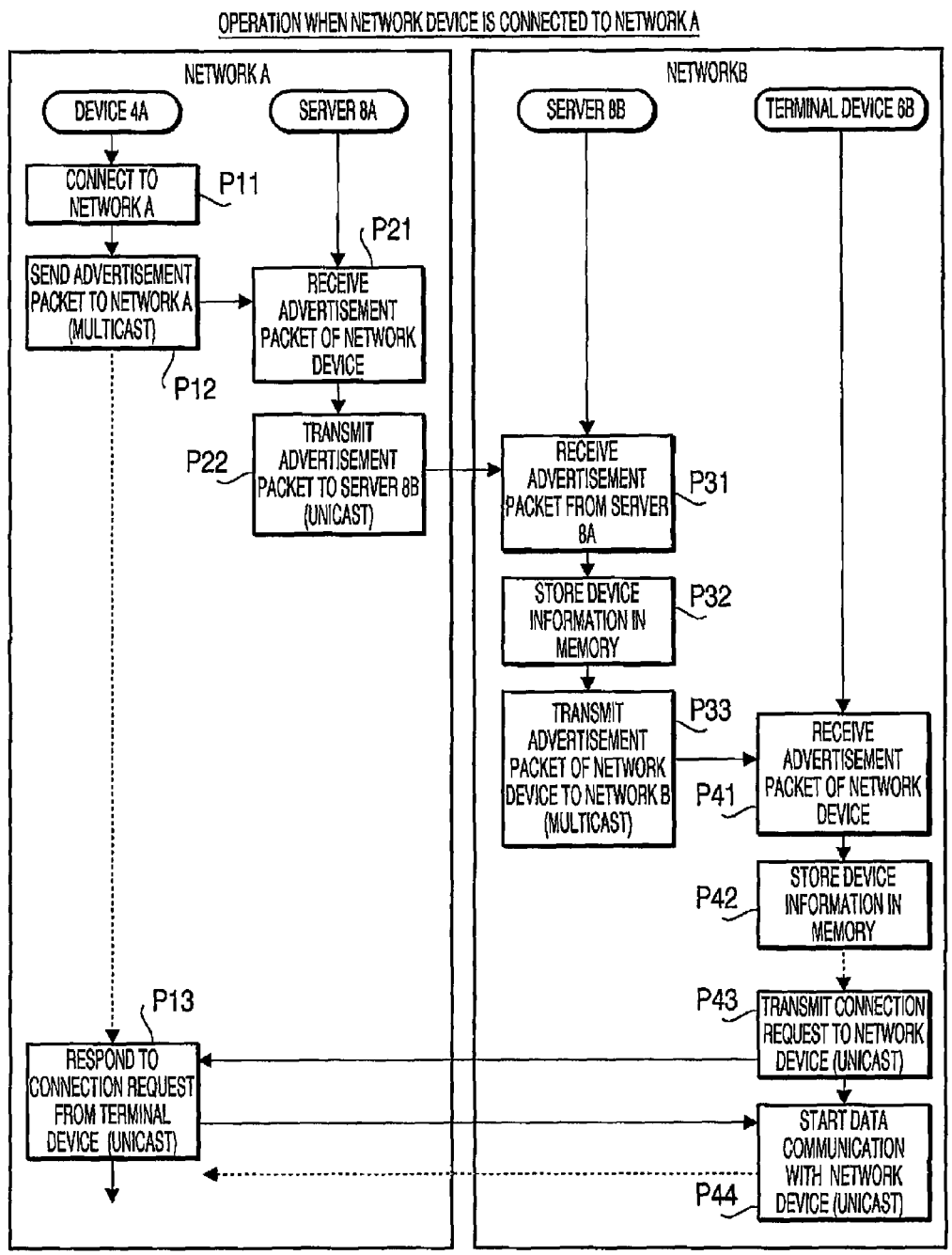

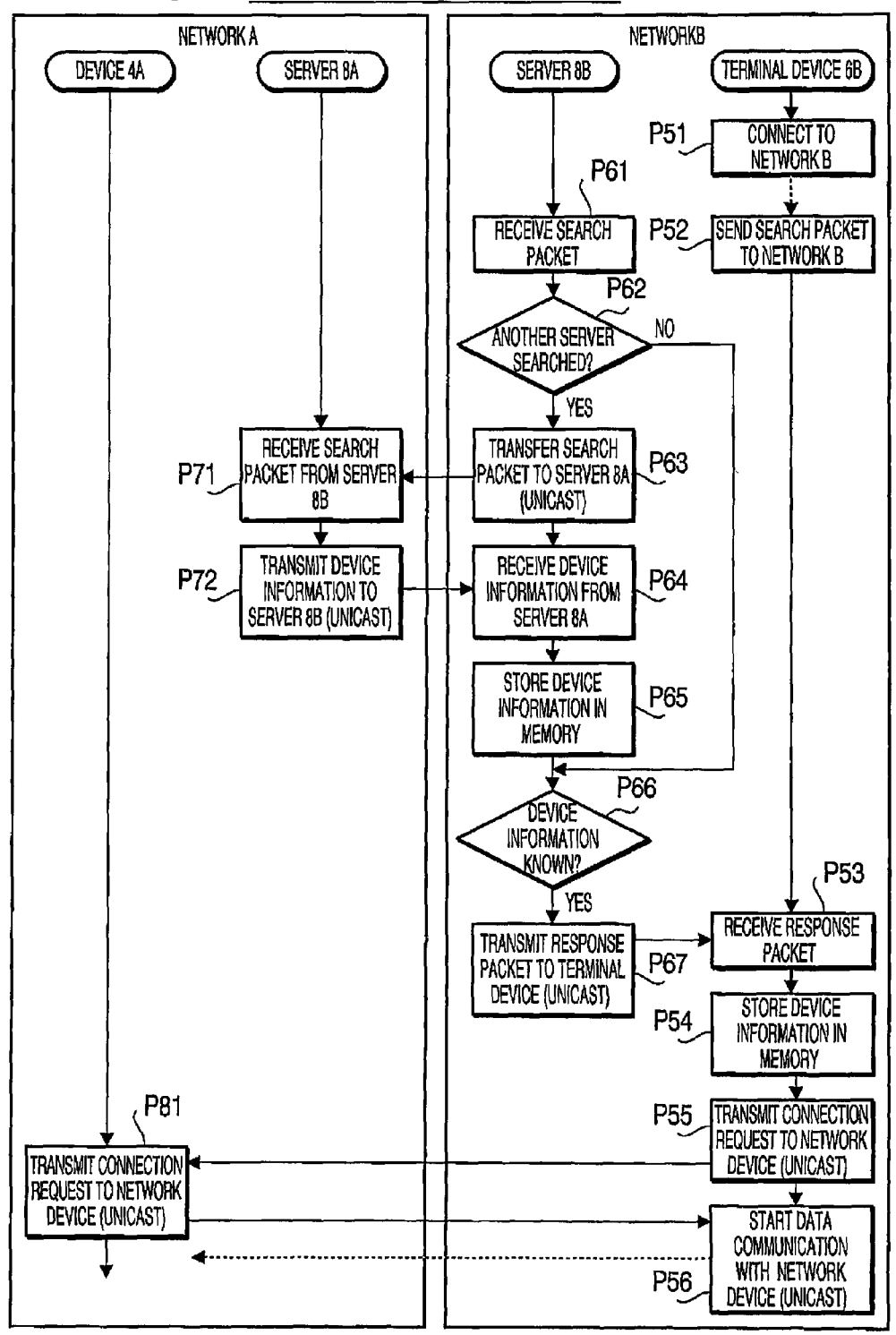

FIG.6A

ADVERTISEMENT PACKET REPRESENTING STATE OF CONNECTING TO NETWORK

NOTIFY * HTTP/1.1 ～ 6A1
HOST: 239.255.255.250:1900 ～ 6A2
CACHE-CONTROL: max-age=1800 ～ 6A3
LOCATION: http://192.168.0.1:50001/Printer/Device.xml ～ 6A4
NT: urn:schemas-upnp-org:device:Printer:1 ～ 6A5
NTS: ssdp:alive ～ 6A6
USN: uuid:2bc195e04a70-1010-8000-00014a06d179::urn:schemas-upnp-org:device:Printer:1 ～ 6A7

FIG.6B

ADVERTISEMENT PACKET REPRESENTING STATE OF BREAKING AWAY FROM NETWORK

NOTIFY * HTTP/1.1 ～ 6B1
HOST: 239.255.255.250:1900 ～ 6B2
NT: urn:schemas-upnp-org:device:Printer:1 ～ 6B3
NTS: ssdp:byebye ～ 6B4
USN: uuid:2bc195e04a70-1010-8000-00014a06d179::urn:schemas-upnp-org:device:Printer:1 ～ 6B5

FIG.6C

SEARCH PACKET

M-SEARCH * HTTP/1.1 ～ 6C1
HOST: 239.255.255.250:1900 ～ 6C2
MAN: "ssdp:discover" ～ 6C3
MX: 1 ～ 6C4
ST: urn:schemas-upnp-org:device:Printer:1 ～ 6C5

FIG.6D

RESPONSE PACKET

HTTP/1.1 200 OK ～ 6D1
CACHE-CONTROL: max-age=1800 ～ 6D2
LOCATION: http://192.168.0.1:50001/Printer/Device.xml ～ 6D3
ST: urn:schemas-upnp-org:device:Printer:1 ～ 6D4
USN: uuid:2bc195e04a70-1010-8000-00014a06d179::urn:schemas-upnp-org:device:Printer:1 ～ 6D5

MESSAGE FOR TRANSFERRING ADVERTISEMENT PACKET

FIG.7A

X-NOTIFY * HTTP/1.1   ~ 7A1
X-MESSAGE-NUM: 1   ~ 7A2

NOTIFY * HTTP/1.1
HOST: 239.255.255.250:1900
CACHE-CONTROL: max-age=1800
LOCATION: http://192.168.0.1:50001/Printer/Device.xml   } ~ 7A3
NT: urn:schemas-upnp-org:device:Printer:1
NTS: ssdp:alive
USN: uuid:2bc195e04a70-1010-8000-00014a06d179::urn:schemas-upnp-org:device:Printer:1

SEARCH REQUEST MESSAGE

FIG.7B

X-SEARCH * HTTP/1.1   ~ 7B1
ST: urn:schemas-upnp-org:device:Printer:1   ~ 7B2

RESPONSE MESSAGE

FIG.7C

HTTP/1.1 200 OK   ~ 7C1
X-MESSAGE-NUM: 1   ~ 7C2

CACHE-CONTROL: max-age=1354
LOCATION: http://192.168.0.1:50001/Printer/Device.xml   } ~ 7C3
ST: urn:schemas-upnp-org:device:Printer:1
USN: uuid:2bc195e04a70-1010-8000-00014a06d179::urn:schemas-upnp-org:device:Printer:1

FIG.11A

MESSAGE REQUESTING FOR DEVICE INFORMATION

```
GET /Printer/Device.xml HTTP/1.1
HOST: 192.168.0.1:50001
```

FIG.11B

XML DATA DESCRIBING DEVICE INFORMATION

```
HTTP/1.1 200 OK                              ← RESPONSE
CONTENT-TYPE: text/xml; charset="utf-8"      ← XML DATA
CONTENT-LENGTH: 1061                         ← DATA LENGTH <?xml version="1.0"?>                        ⊤ BODY
<root xmlns="urn:schemas-upnp-org:device-1-0">
  <specVersion>
    <major>1</major>
    <minor>0</minor>
  </specVersion>
  <URLBase>http://192.168.0.1:50001</URLBase>
  <device>
    <deviceType>urn:schemas-upnp-org:device:Printer:1</deviceType>  ⎫
    <friendlyName>Br88D BR01</friendlyName>                          ⎪
    <maunfacturer>Bro. Ltd.</manufacturer>                           ⎬ INFORMATION ON DEVICE
    <manufacturerURL>http://www.br.com/</manufacturerURL>            ⎪
    <modelDescription>Br Monochrome Laser</modelDescription>         ⎪
    <modelName>Br-88D</modelName>                                    ⎪
    <UDN>uuid:2bc195e04a70-1010-8000-00014a06d179</UDN>              ⎭
    <serviceList>
      <service>
        <serviceType>urn:schemas-upnp-org:service:PrintBasic:1</serviceType>
                                                          ← SERVICE TYPE
        <serviceId>urn:upnp-org:serviceId:PrintBasic</serviceId>
        <SCPDURL>/Printer/PrintBasic.xml</SCPDURL>
                                                          ← LINK LOCATION OF XML DESCRIBING
        <controlURL>/Printer/PrintBasic/control</controlURL>   INFORMATION ON SERVICE
                                                          ← ACCESS TARGET FOR SERVICE
        <eventSubURL>/Printer/PrintBasic/event</eventSubURL> ← ACCESS TARGET FOR
                                                               EVENT INFORMATION
      </service>
    </serviceList>
  </device>
</root>
```

SERVERS AND COMPUTER READABLE MEDIA, METHODS, AND SYSTEMS INCLUDING OR EMPLOYING SERVERS TO PERFORM ONE-TO-ONE COMMUNICATION BETWEEN DEVICES ON DIFFERENT NETWORKS

CROSS-REFERENCE TO RELATED APPLICATION

This application claims priority under 35 U.S.C. §119 from Japanese Patent Application No. 2005-286517, filed on Sep. 30, 2005. The entire subject matter of the application is incorporated herein by reference.

BACKGROUND

1. Technical Field

Aspects of the present invention relate to a network system in which a server on a network provides device information on devices on another network to devices on the server's network.

2. Related Art

Conventionally, a network system in which a terminal device is able to use network devices (e.g., a printer, a scanner or a facsimile device) is widely used. For example, when a terminal device outputs a search request toward an inside network in a multicast or broadcast network device for obtaining device information of the network device, the network device which received the search packet returns its own device information to the server.

Meanwhile, if the network system is configured such that two networks are connected via a router, and the router blocks a one-to-many communication packet from passing therethrough, a search packet formed by a multicast packet and transmitted by a terminal device on one of the networks does not reach a device on the other network. Therefore, a user of a terminal device on one of the networks needs to input device information on a device on the other network manually to the user's terminal device.

In Japanese Patent Provisional Publication No. 2003-6133A (hereafter, referred to as JP 2003-6133A), a network system configured to avoid such a trouble some work is provided. In this network system, a server acquires device information from a device on the other network, and a device on the server's network is able to obtain the device information on devices on the other network from the server.

According to the system disclosed in JP2003-6133A, the server returns device information on devices on the other network to a terminal device in response to a request output by the terminal device.

However, in the network system disclosed in JP 2003-6133A, a terminal device needs to transmit a request for device information to the server in unicast so that the device information on devices on the other network can be obtained. Therefore, it is required to implement a command for searching for device information in each terminal device.

In other words, in the conventional network system the terminal device needs to transmit a dedicated request signal for obtaining device information on devices on the other network in addition to supporting a search request for device information on devices on its own network in broadcast or multicast. Therefore, the user of the terminal device needs to operate the terminal device to save identification information (e.g., a network address or a node name) identifying the server. Such an operation for saving the identification information is very trouble some for the user particularly in the case where the number of terminal devices on one network is relatively large.

SUMMARY

Aspects of the present invention are advantageous in that a network system, in which a device provided on a network is able to obtain device information on devices on another network without considering presence of different networks, is provided.

BRIEF DESCRIPTION OF THE ACCOMPANYING DRAWINGS

FIG. 4 is a sequence diagram illustrating operations of servers and a terminal device when a network device is connected to one of networks.

FIG. 5 is a sequence diagram illustrating operations of servers and a network device when a search packet is output by a terminal device.

FIGS. 6A and B show data structures of advertisement packets.

FIG. 6C shows a data structure of a search packet.

FIG. 6D shows a data structure of a response packet.

FIGS. 7A to 7C show examples of messages transmitted by the server.

Figure 8:
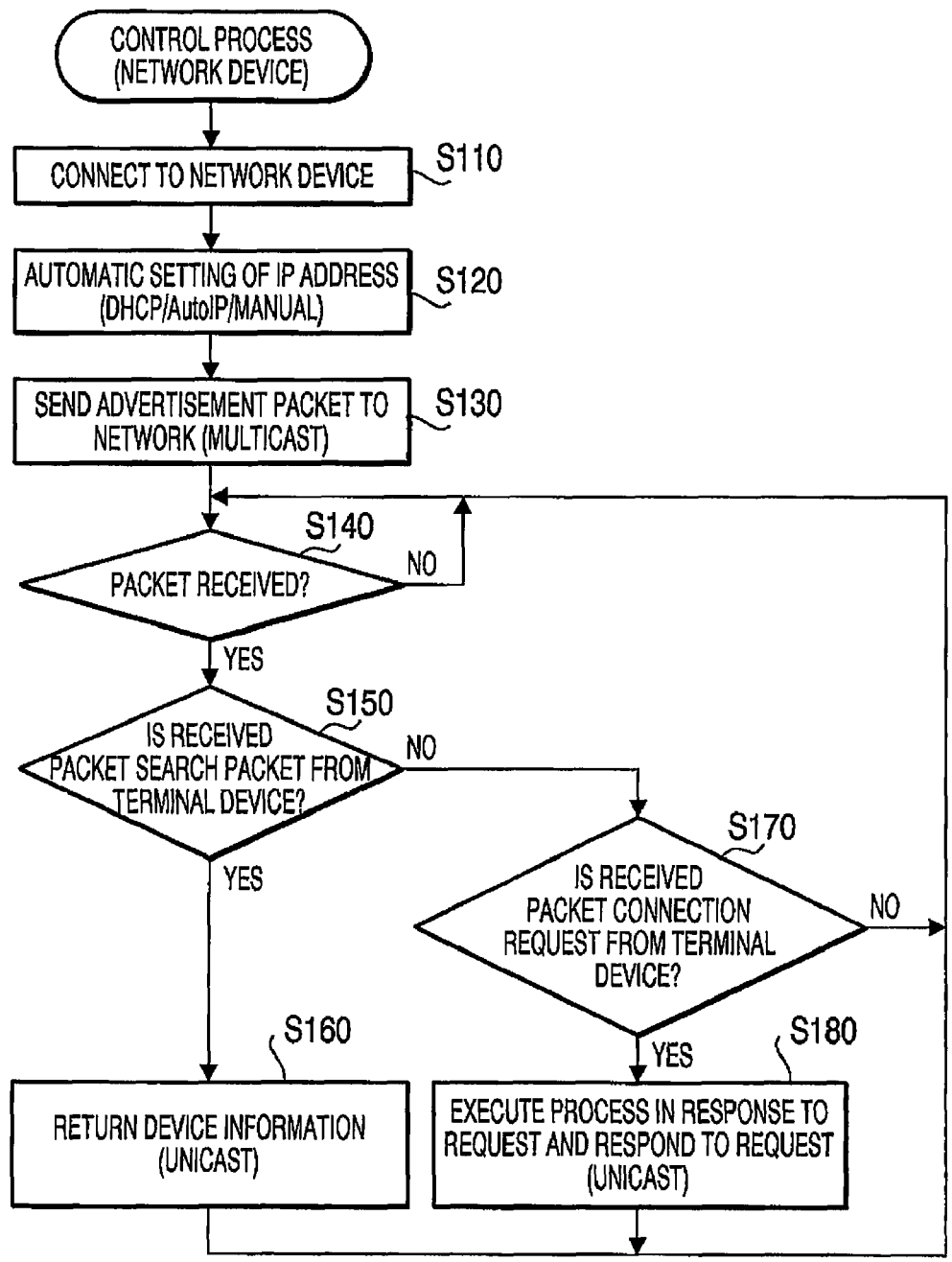

FIG. 8 is a flowchart illustrating a control process executed by the network device.

Figure 9:
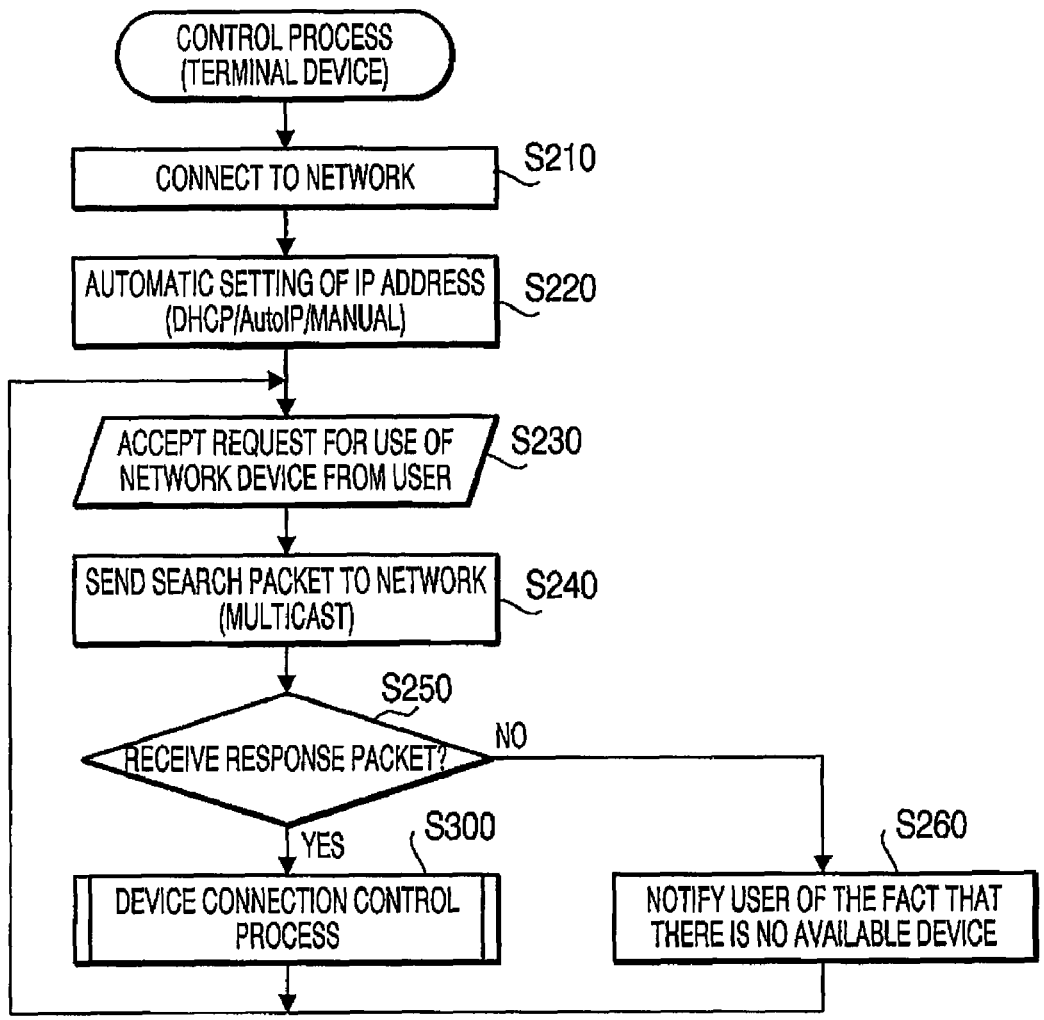

FIG. 9 is a flowchart illustrating a control process executed by the terminal device.

Figure 10:
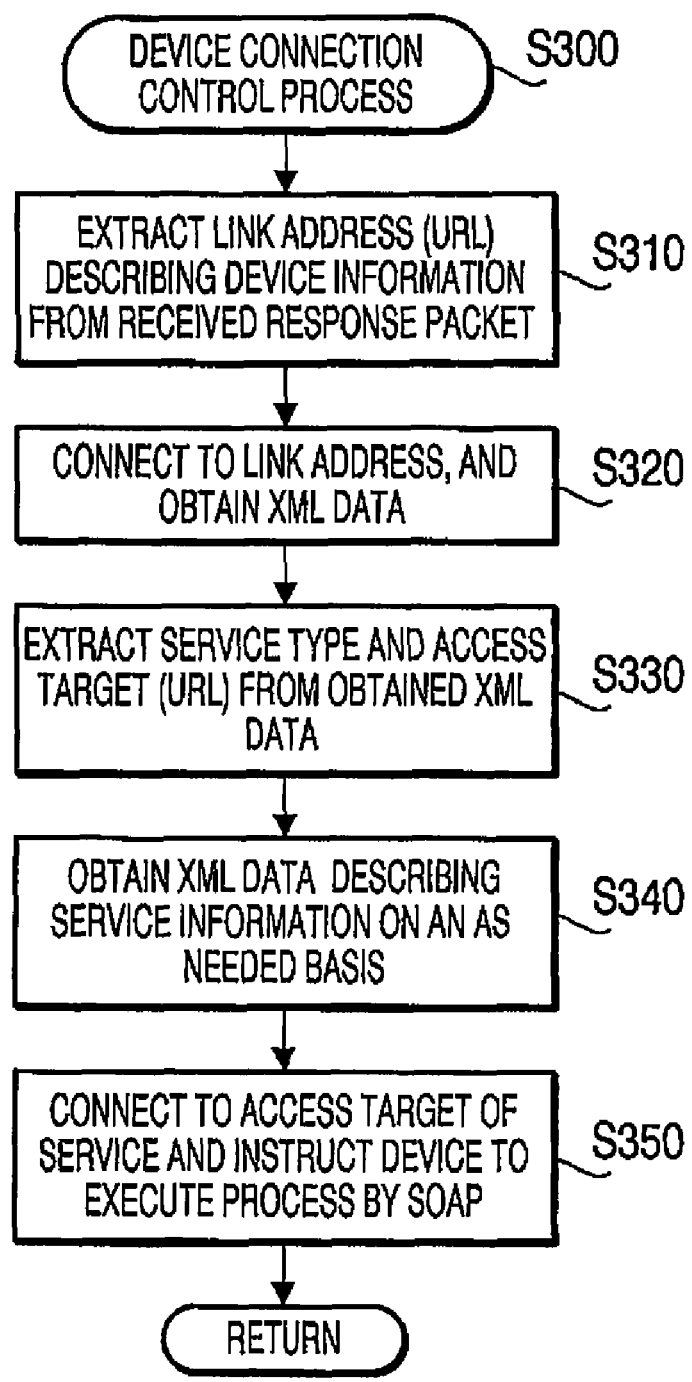

FIG. 10 is a flowchart illustrating a device connection control process executed by the terminal device.

FIG. 11A is an example of XML data used by the terminal device to obtain device information from the network device.

FIG. 11B is an example of XML data describing device information.

Figure 12:
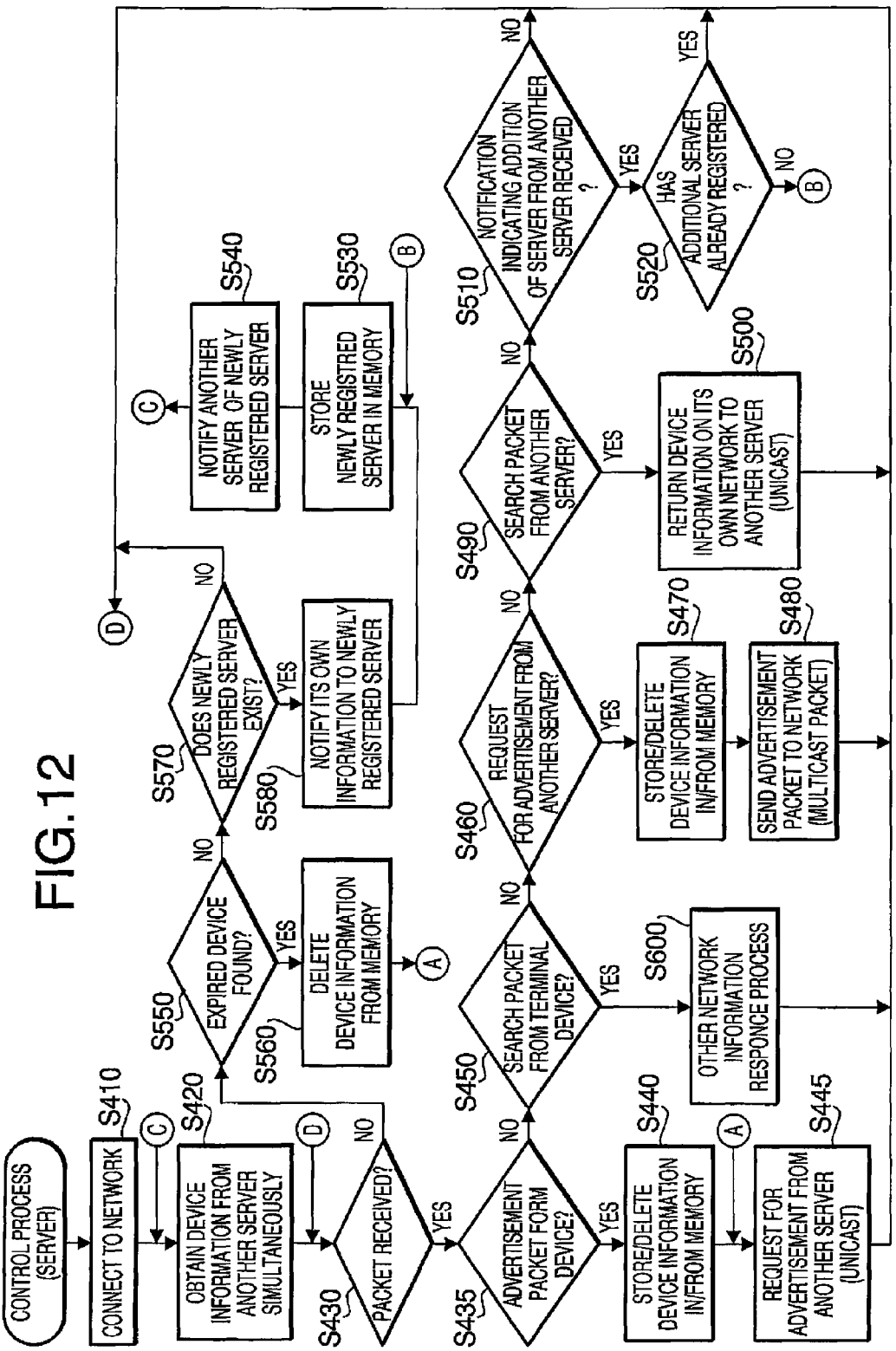

FIG. 12 is a flowchart illustrating a control process executed by the server.

Figure 13:
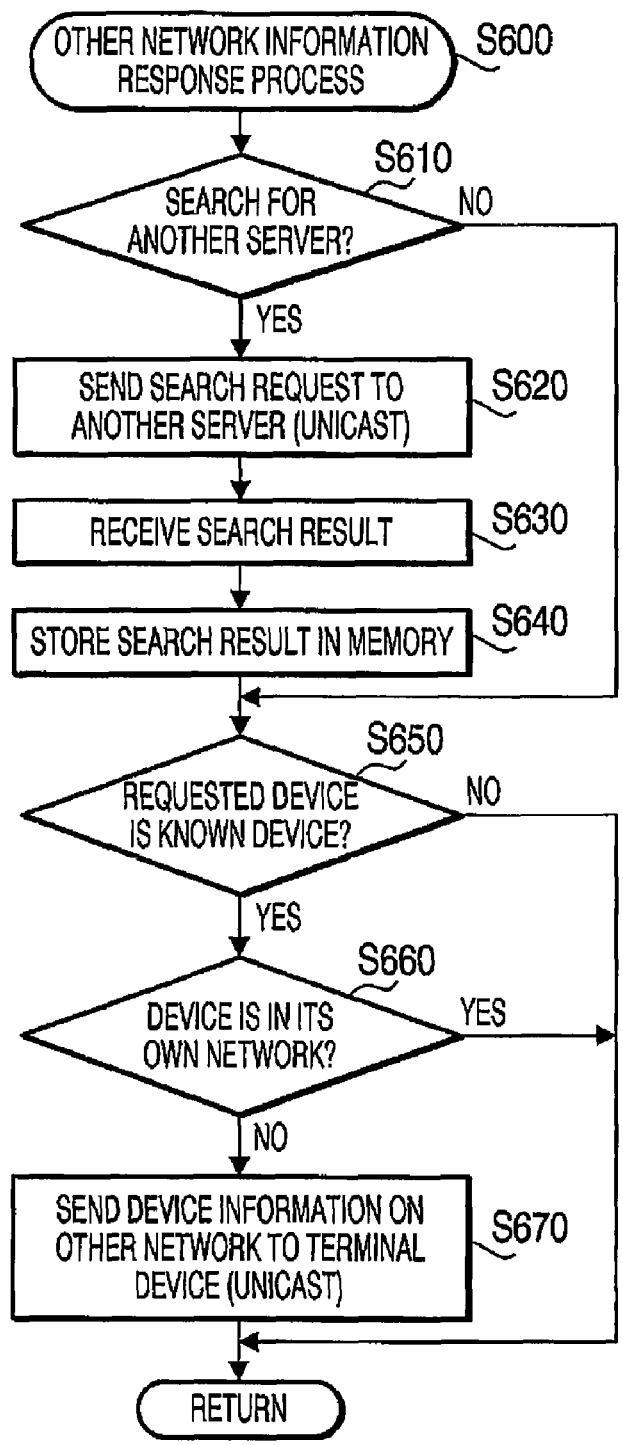

FIG. 13 is a flowchart illustrating an other network information response process executed by the server.

Figure 14A:
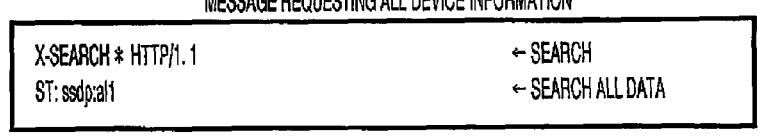
Figure 14B:
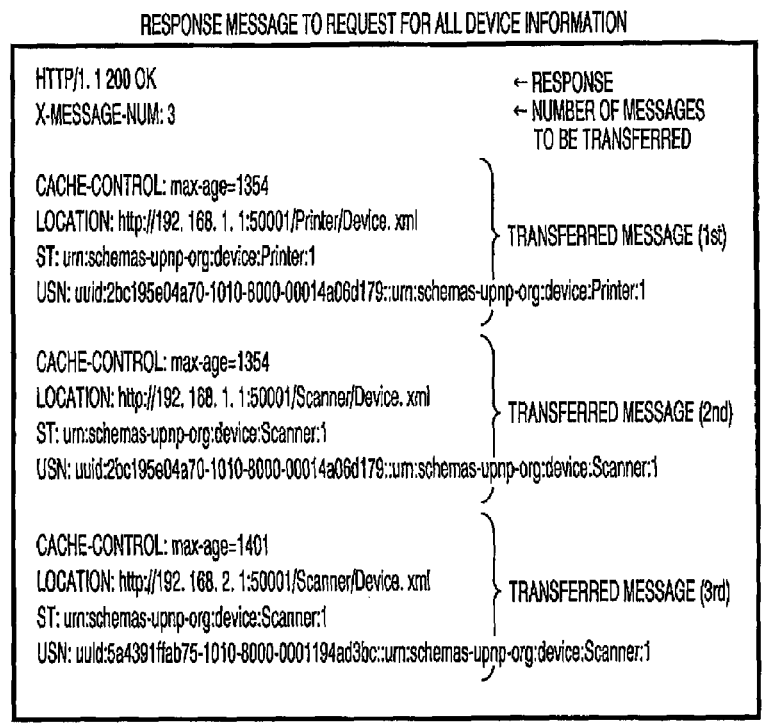
Figure 14C:

FIGS. 14A to 14C are examples of messages exchanged between servers.

DETAILED DESCRIPTION

General Overview

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMS, CD-media, DVD-media, temporary storage, hard disk drives, floppy drives, permanent storage, and the like.

According to an aspect if the invention, there is provided a server provided in a network system in which a router intervenes between different networks to allow at least one device on the different networks to perform one-to-one communication. The server comprises a first device information acquisition unit configured to perform one-to-one communication with a device on another network connected to its own network via the router to acquire device information on the device on another network, and to store the acquired device information in a storage unit, and a device information reply unit configured such that in response to receipt of a search packet searching for device information transmitted in a form of one-to-many communication from a device on the server's network, the device information reply unit extracts the device information matching a search criterion contained in the search packet from the storage unit and returns the extracted device information to the device which transmitted the search packet.

Since a device in the server's network is able to obtain the device information from the server, the device in the server's network is able to communicate with a device on another network in one-to-one communication. In the case where the above configuration is applied to a network system in which a terminal device on the server's network controls an image processing device on another network, the terminal device is able to controls the image processing device without requesting a user to conduct a user operation for inputting device information on the image processing device into the terminal device. If a network device which returns its device information in response to the search packet is provided on the server's network, a device on the server's network is able to obtain the device information on such a network device.

Therefore, a device on one of the networks is able to obtain device information on a device to be accessed via the router without considering differences between the networks. It is not necessity for the device on one of the networks to output various types of signals to obtain device information on devices on the server's network and on another network.

In at least one aspect, the server further comprises a second device information acquisition unit configured to acquire device information on devices on its own network through the one-to-many communication, and stores the acquired device information on devices on its one network in the storage unit, and a device information providing unit configured to perform the one-to-one communication with an information server on another network to provide the device information on devices on its network stored in the storage unit for the information server.

With this configuration, the server on the server's network is able to provide device information on devices on the networks for each of device on the networks. Therefore, a device on one of the networks becomes able to communication with another device on another network in one-to-one communication without being blocked by the router in accordance with limitations on data communication.

The second device information acquisition unit may transmit a packet for searching for device information in accordance with on-to-many communication ro obtain device information on devices on the server's network. Alternatively, the second device information acquisition unit may obtain the device information transmitted form devices on the server's network in one-to-many communication.

In at least one aspect, the device information providing unit provides the device information on devices on its own network for the information server on another network each time the second device information acquisition unit is notified of the device information from a device on its own network.

With this configuration, the server is able to quickly provide device information on devices on the server's network for the information server on another network. It is possible to prevent a trouble caused by delay in providing the device information from occurring.

In at least one aspect, each device on its own network notifies the server of the device information in the one-to-many communication repeatedly at predetermined time intervals. In this case, the server further comprises a device information deletion unit configured such that if the device information on a device on its own network is not obtained within the predetermined time interval, the device information deletion unit deletes the device information on the device, of which device information is not received within the predetermined time interval, from the storage unit. Each time the device information deletion unit deletes the device information form the storage unit, the device information providing unit provides information, indicating that the device information on the device of which device information is not received within the predetermined time interval is deleted, for the information server on another network.

Such a configuration enables the server to immediately notify a device on another network of the fact that a device on the server's network breaks away from the server's network. It is possible to prevent a trouble caused by delay in providing the notification from occurring.

In at least one aspect, at least one device on the server's own network returns its device information in response to receipt of the search packet from a device in the server's own network transmitted in the form of one-to-many communication. In response to receipt of the search packet, the device information reply unit selects the device information matching the search criterion contained in the search packet and returns the selected device information to the device which transmitted the search packet.

With this configuration, it is possible to prevent the device information reply unit fro returning the device information when the search packet is output by a device on the server's network regardless of the fact that the device information is directly returned by a device on the server's network. It is possible to prevent network traffic from being increased by wasteful data on the server's network.

In at least one aspect, the server further comprises a first address information obtaining unit configured to obtain address information on the information server on another network, the address information being inputted externally, an address information notification unit configured to perform one-to-one communication with the information server in accordance with the address information obtained by the first address information obtaining unit to notify the information server of the server's address information; a second address information obtaining unit configured to perform one-to-one communication with the information server to obtain address information on the information server, and an address information setting unit configured such that if the first address information obtaining unit or the second address information obtaining unit obtains the address information on the information server on another network, the address information setting unit sets the obtained address information as an address to be used by the first device information acquisition unit and the device information providing unit in one-to-one communication.

Such a configuration simplifies a setting operation because there is no necessity to input address information on an information server on another network to the server.

According to another aspect of the invention, there is provided a method of providing device information from a server to at least one device on the server's network, the device information concerning at least one device on another network. The method comprises the steps of performing one-to-one communication with a device on another network connected to the server's network via a router to acquire the device information on the device on another network, and storing the acquired device information in a storage unit. The method further comprises, in response to receipt of a search packet searching for device information transmitted in a form of one-to-many communication on the server's network, extracting the device information matching a search criterion contained in the search packet from the storage unit, and returning the extracted device information to the device which transmitted the search packet.

With this configuration, a device on one of the networks is able to obtain device information on a device to be accessed via the router without considering differences between the networks. It is not necessity for the device on one of the networks to output various types of signals to obtain device information on devices on the server's network and on another network.

According to another aspect of the invention, there is provided a computer readable medium having computer readable instructions stored thereon, which, when executed by a server connected to a network, are configured to perform one-to-one communication with a device on another network connected to the server's network via a router to acquire device information on the device on another network, to store the acquired device information in a storage unit, to extract device information matching a search criterion contained in a search packet from the storage unit in response to receipt of the search packet searching for device information transmitted in a form of one-to-many communication on the server's network, and to return the extracted device information to the device which transmitted the search packet.

With this configuration, a device on one of the networks is able to obtain device information on a device to be accessed via the router without considering differences between the networks. It is not necessity for the device on one of the networks to output various types of signals to obtain device information on devices on the server's network and on another network.

According another aspect of the invention, there is provided a network system, which comprises a router which intervenes between different networks in the network system to allow at least one device on the different networks to perform one-to-one communication therethrough, and a server provided in at least one of the different networks. In this system, the server comprises a first device information acquisition unit configured to perform one-to-one communication with a device on another network connected to the server's network via the router to acquire device information on the device on another network, and to store the acquired device information in a storage unit, and a device information reply unit configured such that in response to receipt of a search packet searching for device information transmitted in a form of one-to-many communication from a device on the server's network, the device information reply unit extracts the device information matching a search criterion contained in the search packet from the storage unit and returns the extracted device information to the device which transmitted the search packet.

With this configuration, a device on one of the networks is able to obtain device information on a device to be accessed via the router without considering differences between the networks. It is not necessity for the device on one of the networks to output various types of signals to obtain device information on devices on the server's network and on another network.

In at least one aspect, in the network system the server further comprises a second device information acquisition unit configured to acquire device information on devices on the server's network through the one-to-many communication, and stores the acquired device information on devices on the server's network in the storage unit, and a device information providing unit configured to perform the one-to-one communication with an information server on another network to provide the device information on devices on the server's network stored in the storage unit for the information server.

With this configuration, the server on the server's network is able to provide device information on devices on the networks for each of device on the networks. Therefore, a device on one of the networks becomes able to communication with another device on another network in one-to-one communication without being blocked by the router in accordance with limitations on data communication, According to another aspect of the invention, there is provided a method for sharing a device in a network system in which a router intervenes between different networks to allow at least one device on the different networks to perform one-to-one communication. The method comprises the steps of performing, on a server connected on one network of the different networks, one-to-one communication with a device on another network connected to the server's network via the router to acquire device information on the device on another network, storing, on the server, the acquired device information in a storage unit, extracting, on the server, the device information matching a search criterion contained in a search packet from the storage unit in response to receipt of the search packet searching for device information transmitted in a form of one-to-many communication on the server's network from a device on the server's network, returning the extracted device information from the server to the device which transmitted the search packet, and receiving, on the device on the server's network, the device information transmitted from the server after the device on the server's network transmits the search packet.

With this configuration, a device on one of the networks is able to obtain device information on a device to be accessed via the router without considering differences between the networks. It is not necessity for the device on one of the networks to output various types of signals to obtain device information on devices on the server's network and on another network.

Embodiment

Hereafter, an embodiment according to the invention will be described with reference to the accompanying drawings.

Figure 1:
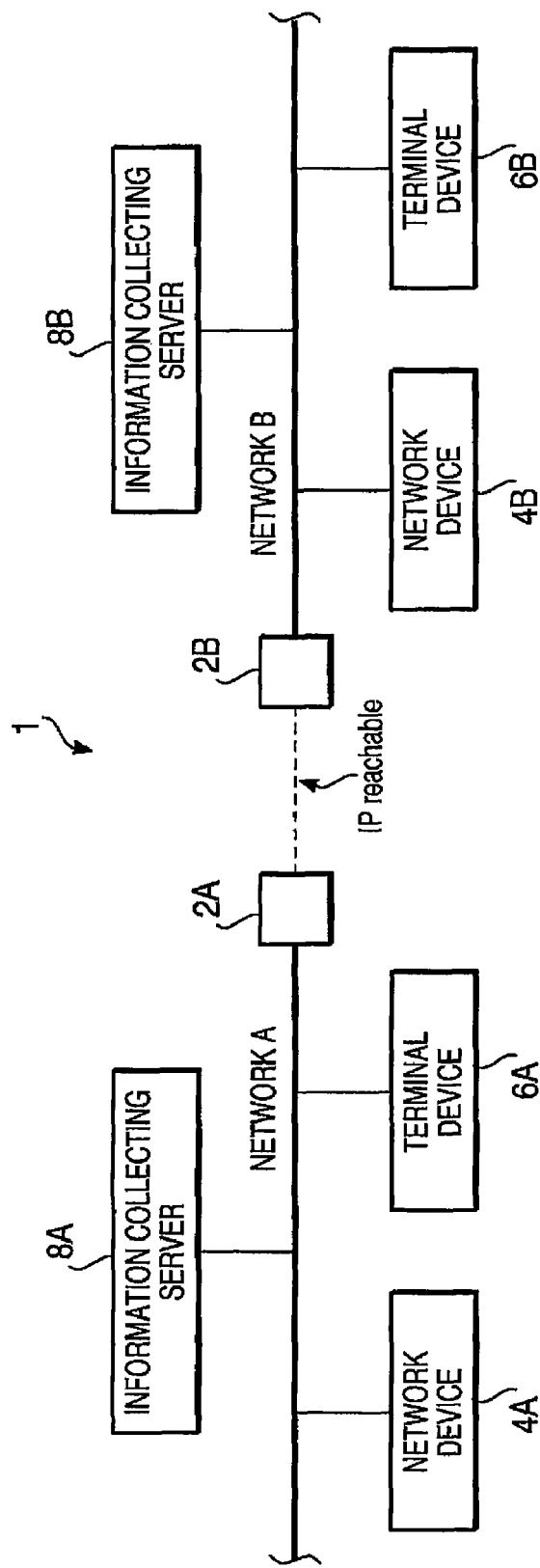
FIG. 1 is a block diagram of a network system according to an embodiment of the invention.

FIG. 1 is a block diagram of a network system 1 according to an embodiment of the invention. The network system 1 includes networks A and B which are connected to an IP-reachable network (e.g., the Internet) via routers A and B, respectively. Each of the network A and B is a network implemented on particular premises (e.g., LAN).

To the networks A and B, network devices 4A and 4B (each of which is, for example, a multifunction peripheral having functions as a scanner and a printer) are connected, respectively. Terminal devices 6A and 6B are also connected to the networks A and B, respectively. Each of the terminal device 6A and 6B is, for example, a personal computer having a function of inputting and outputting images through the device 4A (4B). The terminal device 6A has a function of automatically detecting the network device 4A on the network A by outputting a multicast packet (e.g., an advertisement packet or a search packet) in accordance with a technical standard UPnP (Universal Plug and Play™). The terminal device 6B has a function of automatically detecting the network device 4B on the network B by outputting a multicast packet (e.g., an advertisement packet or a search packet) in accordance with a technical standard UPnP (Universal Plug and Play™).

Each of the routers 2A and 2B allows an incoming unicast packet and an outgoing unicast packet (i.e., a unicast packet for one-to-one communication flowing between the inside network and the outside network) to pass therethrough, but block a broadcast packet and a multicast packet (i.e., a packet for one-to-many communication). Generally, a router intervening between an inside network and an outside network employs such a function of blocking multicast and broadcast packets for the purpose of security, reduction in traffic and easiness of network management.

In this configuration, the terminal device 6A is able to detect devices (i.e., the network device 4A) on the network A, but is not able to detect devices on the outside network (e.g., the network device 4B on the network B). Similarly, the terminal device 6B is able to detect devices (i.e., the network device 4B) on the network B, but is not able to detect devices on the outside network (e.g., the network device 4A on the network A). For this reason, device information collecting servers 8A and 8B are provided for the networks A and B, respectively.

The device information collecting server 8A collects device information on devices on the other network B using a unicast packet, and provides the collected device information for the terminal device 6A on the inside network A. Similarly, the device information collecting server 8B collects device information on devices on the other network A using a unicast packet, and provides the collected device information for the terminal device 6B on the inside network B. hereafter, the device information collecting server 8A or 8B is simply referred to as a server 8A or 8B.

Figure 2:
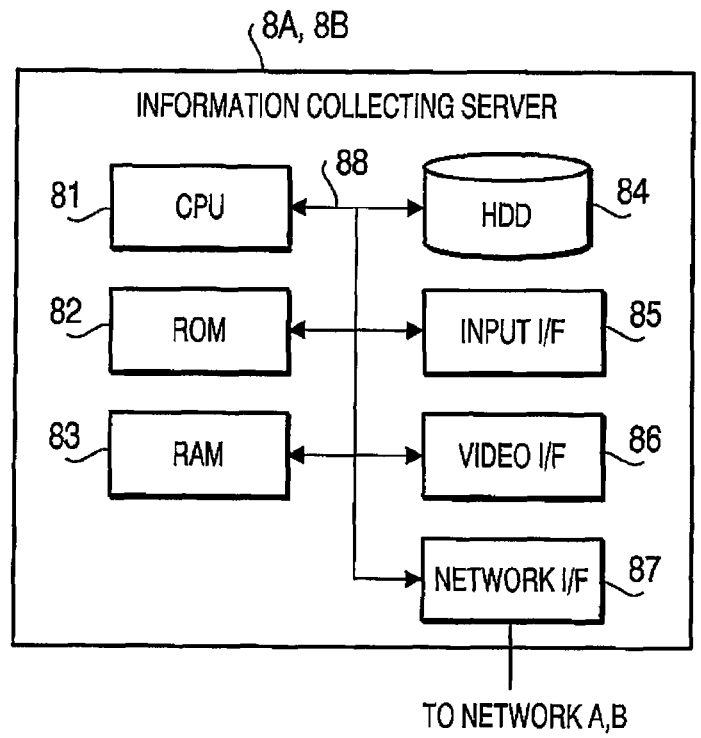
FIG. 2 is a block diagram of a server provided in each network in the network system.

FIG. 2 is a block diagram of each of the servers 8A and 8B. The server 8A (8B) includes a CPU 81 executing various processes including a process for device information collection, a ROM 82 in which various programs including a BIOS are stored, a RAM 83 used as a work memory for the CPU 81, an HDD 84 in which various data such as a server program for causing the server to function as a device information collecting server and the collected device information are stored, an input interface 85 for allowing a user to input data through an operation unit (e.g., a keyboard or a mouse) to the CPU 81, a video interface 86 for displaying information in accordance with instructions form the CPU 81, a network interface 87 interfacing the CPU 81 to the network A (B). These components are connected to each other via a bus 88.

Figure 3:
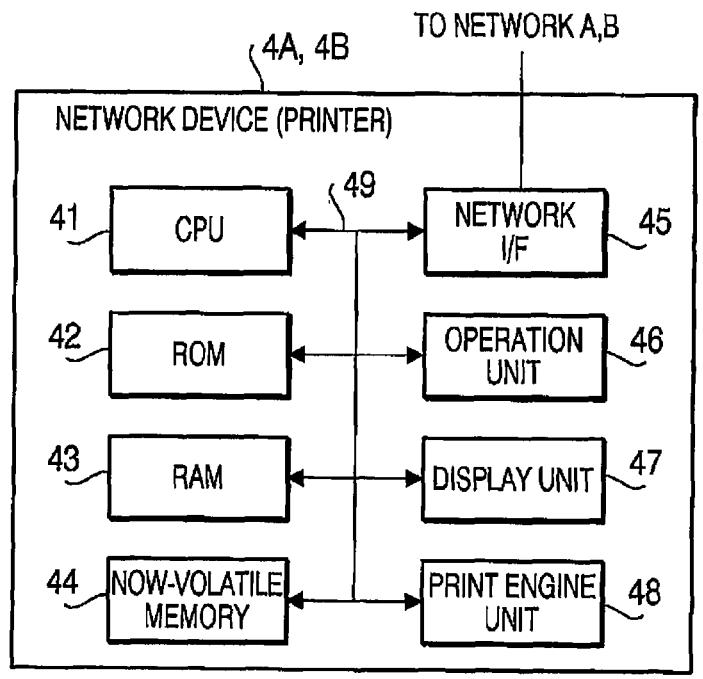
FIG. 3 is a block diagram of a network device provided in the network system.

Each of the network devices 4A and 4B is capable of performing data communication in accordance with DLNA Digital Living Network Alliance). FIG. 3 is a block diagram of the network device 4A (4B). The network device 4A (4B) includes a CPU 41 controlling internal components, a ROM 42 in which various programs to be executed by the CPU 41 and various types of information including device information (e.g., an IP address, a model name, a printing property and the number of print colors of the network device 4A (4B)) are stored, a RAM 43 used as a work memory for the CPU 41, a non-volatile memory 44 storing data generated by the CPU 41 and error information, a network interface 45 interfacing the CPU 41 with the network A (B). These components are connected to each other via a bus 49.

As described above, the network device 4A (4B) has a function as a printer. That is, the network device 4A (4B) includes an operation unit 46 through which instructions to operate the print function are inputted to the CPU 41, and a display unit 47 on which information including a status of the print function is displayed, and a print engine unit 48 executing a print operation in accordance with instructions form the CPU 41.

In the network system 1, when the network device 4A is connected to the network A, the servers 8A and 8B on the networks A and B, and the terminal device 6B on the other network B operate as follows. FIG. 4 is a sequence diagram for this situation. In FIG. 4 (and in the following similar drawings), reference symbols "Pxx" represent steps numbers.

As shown in FIG. 4, when the network device 4A is connected to the network A, the network device 4A (P11), the network device 4A sends out an advertisement packet containing its own device information to the network A as a multicast packet (P12). Then, the server 8A on the network A receives the advertisement packet (P21), and transmits the received advertisement packet to the server 8B in the other network B as a unitcast packet (P22).

The server 8B on the network B receives the advertisement packet (unicast packet) from the server 8A (P31). Then, the server 8B stores the device information contained in the received advertisement packet in the HDD 84 (P32), and sends out the received advertisement packet to the network B as a multicast packet (P33).

Then, the terminal device 63 on the network B receives the advertisement packet sent out by the server 8B (P41), and stores the device information contained in the received advertisement packet) in an storage unit thereof (not shown) (P42). The terminal device 6B thus obtains the device information of the network device 4A on the network A.

If a request for use of the network device 4A is inputted on the terminal device 6B by a user sitting at the terminal device 6B after the above sequence is finished, the terminal device 6B transmits a connection request to the network device 4B as a unicast packet to the network device 4A in accordance with device information stored thereon (P43).

Then, the network device 4A receives the connection request form the terminal device 6B, and returns a response to the connection request to the terminal device 6B (P13). Then, the terminal device 6B receives the response form the network device 4A and starts data communication with the network device 4B (P44). The terminal device 6B thus becomes able to cause the network device 4B to execute operations (e.g., a printing operation).

The above mentioned sequence occurs when the network device 4A is connected to the network A. When the network device 4B is connected to the network B, the servers 8B, 8A and the terminal device 6A execute the similar sequence.

When a search request for device information of a device is inputted to the terminal devices 6A (6B), the terminal device 6A (6B) sends out a search packet on its own network to search for the requested device. FIG. 5 shows such a sequence.

As shown in FIG. 5, when the terminal device 6B is connected to the network B (P51, and a search request is inputted to the terminal device 6B, the terminal device 6B sends out a search packet to the network B as a multicast packet to search for a requested device (P52).

The server 8B on the same network B receives the search packet sent out by the terminal device 6B (P61). Then, the server 8B checks its settings to judge whether the setting for searching the server 8A on the other network A for searching for devices is enabled (P62). If the setting for searching the server 8A on the other network A for searching for devices is enabled (P62: YES), the server 8B transmits a search packet to the server 8A on the other network A as a unicast packet (P63).

Then, the server 8A receives the search packet (P71), and transmits the device information of the device 4A on the network A to which the server 8A is also connected, to the server 8B (P72). On the other hand, after transmitting the search packet, the server 8A waits for the device information form the server 8A. When the server 8A receives the device information (P64), the server 8A stores the received device information in the HDD 84 (P65).

If the server 8B thus obtains the device information from the server 8A (P65) or if the setting for searching the server 8A on the other network A for searching for devices is not enabled (P62: NO), control proceeds to P66 where the server 8B judges whether device information equal to the device information requested by the terminal device 6B is stored in the HDD 84 thereof (i.e., whether the device information request by the terminal device 6B is known information) (P66).

If the device information requested by the terminal device 6B is known information, the server 8B transmits a response packet containing the device information of the requested device, as a unicast packet. If the device information requested by the terminal device 6B is not the known information, the server 8B does not transmits a response.

When the response packet is transmitted by the server 8B, the terminal device 6B which transmitted the search packet receives the response packet (P53). Then, the terminal device 6B stores device information stored in the received response packet in a storage device (e.g., an HDD) thereof (P54).

After the terminal device 6B obtains the device information of the network device 4A, the terminal device 6B transmits a connection request to the network device 4A as a unicast packet (P55). Then, the network device 4A returns a response to the connection request to the terminal device 6B (P83). The terminal device 6B receives the response and starts to data communication with the network device 4A (P56), and becomes able to cause the network device 4A to execute a desirable operation (e.g., a printing operation).

The above mentioned sequence occurs when terminal device 6B sends out the search packet to the network B. When the terminal device 6A sends out a search packet to the network A, the servers 8B, 8A and the terminal device 6A execute the similar sequence.

FIG. 6A shows a data structure of the advertisement packet which the network device 4A (4B) uses to notify other devices of the presence of the network device 4A (4B) on the network A (B). As shown in FIG. 6A, the advertisement packet includes information indicating the packet is an advertisement packet (see a reference symbol 6A1), information indicating that the packet is transmitted in multicast (see a reference symbol 6A2), information on an available period of the packet (see a reference symbol 6A3), information on a link address of its own device information (see a reference symbol 6A4), information representing the device type (a printer in FIG. 6A) (see a reference symbol 6A5), information indicating that the device is on the network (see a reference symbol 6A6), and the device information (see a reference symbol 6A7).

Advertisement packets formed by the network device 4A (4B) include a packet indicating that the network device 4A (4B) is disconnected from the network A (B) (hereafter, this advertisement packet is referred to as a disconnection advertisement packet). If the server 8A (8B) receives the disconnection advertisement packet form the network device 4A (4B) on the inside network A, the server 8A (8B) deletes the device information of the device 4A (4B) from the HDD 84, and transmits information representing deletion of the device information to the server 8B (8A).

FIG. 6B shows a dada structure of the disconnection advertisement packet. As shown in FIG. 6B, the disconnection advertisement packet includes information indicating that the packet is an advertisement packet (see a reference symbol 6B1), information indicating that the packet is transmitted in multicast (see a reference symbol 6B2), information representing the device type (a printer in FIG. 6B) (see a reference symbol 6B3), information indicating that the device is disconnected from the network (see a reference symbol 6B4), and the device information (see a reference symbol 6B5).

FIG. 6C shows a data structure of the search packet used by the terminal device 6A (6B) to search for devices on the network A (B). As shown in FIG. 6C, the search packet includes information indicating that the packet is a search packet (see a reference symbol 6C1), information indicating that the packet is transmitted in multicast (see a reference symbol 6C2), information indication that the packet is a search packet (see a reference symbol 6C3), information representing a time for waiting for a reply (see a reference symbol 6C4), and information representing the device type (a printer in FIG. 6C) (see a reference symbol 6C4).

FIG. 6D shows a data structure of the response packet used by the network device 4A (4B) to return the device information in response to the search packet. As shown in FIG. 6D, the search packet includes information indicating that the packet is a response packet (see a reference symbol 6D1), information on an available period of the packet (see a reference symbol 6D2), information on a link address of its own device information (see a reference symbol 6D3), and its own device information (see a reference symbol 6D4).

FIG. 7A shows a data structure of a message used by the server BA (8B) to transfer the advertisement packet received from the network device 4A (4B) on its own network A (B) to the server 8B (8A) in the other network B (A). As shown in FIG. 7A, in the message, information indicating transfer of an advertisement packet (see a reference symbol 7A1) and information indicating the number of transferred messages (i.e., the number of advertisement packets) (see a reference symbol 7A2) are added to the message to be transferred (see a reference symbol 7A3).

FIG. 7B shows a data structure of a message (search request message) to be used by the server 8A (8B) to transmit a search request for device information to the server 8B (8A) on the other network B (A). As shown in FIG. 7B, the search request message includes information indicating that the packet is a search request and information (see a reference symbol 7B1), and information on the type of the device to be searched (see a reference symbol 7B2).

FIG. 7C shows a data structure of a response message to be used by the server 8A (8B) which received the search request message to return the response message to the server 8B (8A) which transmitted to the search request message thereto. As shown in FIG. 7C, the response message includes information indicating that the packet is a response message (see a reference symbol 7C1), information indicating the number of transferred messages (i.e., the number of pieces of device information) (see a reference symbol 7C2), and the device information to be transferred (see a reference symbol 7C2). The device information is retrieved from the HDD 84. That is, to the response message, the device information represented in the advertisement packet or the response packet is attached without being modified (see a reference symbol 7C3).

As described above, in the network system 1, the terminal device 6A on the network A provides device information of the device 4A on the network A to the terminal device 6B on the other network B. On the other hand, the terminal device 6B on the network B provides device information of the device 4B on the network B to the terminal device 6A on the other network A. With this configuration, the terminal device 6A (6B) is able to use the network device 4B (4A) on the other network B (A). In other words, in the network system 1, the network devices 4A and 4B are shared between the networks A and B. Hereafter, processes for achieving such advantages to be executed by the network devices 4A and 4B, the terminal devices 6A and 6B, and the servers 8A and 8B are explained in detail.

FIG. 8 is a flowchart illustrating a control process executed on each of the network devices 4A and 4B. The control process shown in FIG. 8 is executed repeatedly under control of the CPU 41 after the power of the network device 4A (4B) is turned to ON.

First, the network device 4A (4B) operates to connect the network device 4A (4B) to the network A (B) through the network interface 45 (step S110). Then, the network device 4A (4B) sets an IP address thereof (step S120). As its own IP address, an IP address designated by a DHCP server, an IP address automatically selected by the function of an AUTOIP, or an IP address which has been set to the network device 4A by the user is used.

Then, the network device 4A (4B) sends out an advertisement packet shown in FIG. 6A (step S130), and judges whether a packet from another network device is received (step S140). The network device 4A (4B) waits until a packet form another network device is received (S140: NO). If a packet is received (S140: YES), control proceeds to step S150 where the CPU 41 judges whether the received packet is a search packet transmitted from the terminal device 6A (6B) as a multicast packet (step S150). If the received packet is a search packet (S150: YES), the network device 4A (4B) transmits its own device information to the terminal device 6A (6B) as a response packet formed as a nicest packet, to the terminal device 6A (6B) which transmitted the search packet. Then, control returns to step S140.

If the received packet is not a search packet (S150: NO), control proceeds to step S170 where the network device 4A (4B) judges whether the received packet is a connection request from the terminal device 6B (6A). If the received packet is not the connection request (S170: NO), control returns to step S140. If the received packet is the connection request (S170: YES), the network device 4A (4B) executes a process for the connection request, and responds to the connection request (step S180). Then, control returns to step S140.

It should be noted that the network device 4A (4B) sends out an advertisement packet for disconnection shown in FIG. 6A to the inside network A (B) if the power of network device 4A (4B) is turned to OFF or a disconnection instruction is inputted by the user through the operation unit 46.

By sending out the advertisement packet shown in FIG. 6A periodically, the network device 4A (4B) notifies device on its own network of presence thereof. The control process shown in FIG. 8 is executed repeatedly in a period shorter than the available period of the packet indicated in the advertisement packet. The network device 4A (4B) may additionally sends out a change notification packet for notifying other devices of a change of its state each time its state changes.

FIG. 9 is a flowchart illustrating a control process executed on each of the terminal device 6A and 6B. The control process shown in FIG. 9 is executed repeatedly under control of a CPU of the terminal device 6A (6B) after the power of the terminal device 6A (6B) is turned to ON.

First, the CPU of the terminal device 6A (6B) connects the terminal device 6A (6B) to the network A (B) through a network interface thereof (not shown) (step S210). Then, the terminal device 6A (6B) sets an IP address thereof (step S220). As its own IP address, an IP address designated by a DHCP server, an IP address automatically selected by the function of an AUTOIP, or an IP address which has been set to the network device 4A by the user is used.

Next, the terminal device 6A (6B) executes a user request reception process in which terminal device 6A (6B) accepts a request for use of a device inputted by a user through use of a keyboard and a mouse thereof (step S230). If a request for use of a device is accepted in step S230, the terminal device 6A (6B) sends out a search packet shown in FIG. 6C to its own network A (B) (step S240). Then, the terminal device 6A (6B) judges whether a response packet (see FIG. 6D) to the search packet is received (step S250).

If the response packet is not received (S250: NO), control proceeds to step S260 where the terminal device 6A (6B) notifies the user of information indication that there is not available device, for example, through a display thereof. Then, control proceeds to step S230. If a response packet is received (S250: YES), control proceeds to step S300 where the terminal device 6A (6B) executes a device connection control process for performing data communication with a device which returned the response packet. Then, control returns to step S230.

FIG. 10 is a flowchart illustrating the device connection control process executed in step S300. When the device connection control process is initiated, the terminal device 6A (6B) extracts a link address (e.g., a URL) of the device information described in the received response packet (step S310). Then, terminal device 6A (6B) transmits a request message (see FIG. 11A) to the extracted link address to acquire XML (eXtensible Markup Language) data (see FIG. 11B) describing the device information from the link address (step S320).

Next, the terminal device 6A (6B) extracts service types and link addresses of services which the designated device (4B or 4A) is able to provide, from the acquired XML data (step S330). The terminal device 6A (6B) thus acquires the detailed information on the designated device.

After the terminal device 6A (6B) extracts the service types and link addresses of services which the designated device (4B or 4A) is able to provide, the terminal device 6A (6B) is able to extract a link address of XML data concerning service information from the XML data describing the device information and to acquire XML data concerning the service information from the link address. The terminal device 6A (6B) is thus able to check details of the service (step S340).

Then, the terminal device 6A (6B) instructs the designated device to execute a desired process in accordance with a SOAP (Simple Object Access Protocol) in which XML is used (step S350).

FIG. 12 is a flowchart illustrating a control process executed on each of the server 8A and 8B. The control process is executed repeatedly under control of the CPU 81 after power of the server 8A (8B) is turned to ON.

First, the CPU 81 operates to connect the server 8A (8B) to the network A (B) through the network interface 87 (step S410). Then, the server 8A (8B) transmits a message (see FIG. 14A) requesting for device information to the server 8B (8A) on the other network B (A) as a unicast packet to simultaneously acquire device information on of all the devices connected to the other network B (A). After acquiring the device information, the server 8A (8B) stores it in the HDD 84 (step S420).

FIG. 14B shows a data structure of a response message to the message requesting the other server to simultaneously transmit device information. As shown in FIG. 14B, the response message includes information indication that the packet is a response message, information on the number of messages (i.e., the number of pieces of device information) to be transferred, and device information to be transferred (i.e., messages read from the HDD 84). That is, to the response message, the device information represented in the advertisement packet or the response packet is attached without being modified (see a reference symbol 7C3). The server 8A (8B) thus obtains device information from the other server simultaneously.

Next, the server 8A (8B) judges whether a packet from a device on the network to which the server 8A (8B) is connected is received (step S430). If the server 8A (8B) judges that a packet is received (S430: YES), the server 8A (8B) judges whether the received packet is an advertisement packet from the network device 4A (4B) on its own network A (B) (step S435). Alternatively, the server 8A (8B) may judge in step S435 whether the received packet is a change notification packet.

If the received packet is an advertisement packet from the network device 4A (4B) on its own network A (B) (S435: YES) or the received packet is a change notification packet (S435: YES), control proceeds to step S440 where the server 8A (8B) executes a process for storing device information in the HDD 84 or deleting device information from the HDD 84 in response to the received advertisement packet (step S440). That is, the server 8A (8B) stores device information in the HDD 84 if the received advertisement packet is the advertisement packet for connection shown in FIG. 6A, while the server 8A (8B) deletes device information from the HDD 84 if the received advertisement packet is the advertisement packet for disconnection shown in FIG. 6B.

If the server 8A (8B) receives an advertisement packet from a device of which device information has not been stored in the HDD 84, the server 8A (8B) stores the received device information in association with time information representing the current time. On the other hand, if the server 8A (8B) receives an advertisement packet from a device of which device information has already been stored in the HDD 84, the server 8A (8B) updates the time information associated with the device information to the current time. If the server 8A (8B) receives a change notification packet representing change of a status from a device of which device information has already been stored in the server 8A (8B), the server 8A (8B) updates the time information associated with the stored device information to the current time and associates information indicating the status is changed with the stored device information.

After thus updating the device information in the HDD 84 in step S440, the server 8A (8B) an advertisement packet (see FIG. 7A) for notifying the terminal device 6A (6B) on the other network B (A) of information on the added or deleted device, and transmits the advertisement packet to the server 8B (8A) on the other network B (A) as a unicast packet. Then, control returns to step S430.

Such a configuration enables the terminal device on the other network to become able to use the network device on the inside network immediately after the network device participates in the inside network. In addition, the terminal device is prevented from using the network device on the other network regardless of the fact that the network device is already off the network, and thereby preventing occurrence of a failure on the terminal device and increase in network traffic due to packets output by the terminal device addressed to the network device which is already off the network. Such a configuration also enables the terminal device 6B on the other network B to know that the status of the network device 4A (4B) on the network A (B) is changed.

If the received packet is not an advertisement packet from the network device 4A (4B) on its own network A (B) (S435: NO), control proceeds to step S450 where the server 8A (8B) judges whether the receive packet is a search packet (see FIG. 6C) transmitted by the terminal device 6A (6B) on its own network A (B).

If the received packet is a search packet transmitted by the terminal device 6A (6B) on its own network A (B) (450: YES), control proceeds to step S600 where the server 8A (8B) executes an other network information response process. In the other network information response process, the server 8A (8B) searches for device information on a device on the other network selected from requested device information contained in the received search packet, and transmits a response packet (see FIG. 6D) representing a result of searching to the terminal device 6A (6B) which transmitted the search packet.

FIG. 13 is a flowchart illustrating the other network information response process executed by the server 8A (8B). When the other network information response process is initiated, the server 8A (8B) judges whether an operation mode in which the server 8A (B) searches for the server 8B (8A) on the other network for device searching is enabled (step S610). If the operation mode in which the server 8A (B) searches for the server 8B (8A) on the other network for device searching is not enabled (S610: NO), control proceeds to step S650 where the server 8A (8B) search the HDD 84 to judge whether the device information requested by the terminal device is know information.

If the requested device information is know information (step S650: YES), the server 8A (8B) further judges whether all of the devices of which device information is known are on its own network 4A (4B) (step S660). If at least one of the devices of which device information is know is on the other network (S660: NO), the server 8A (8B) transmits the device information on the device on the other network to the terminal device which transmitted the search packet, as a response packet shown in FIG. 6D.

If it is judged in step S610 that the operation mode in which the server 8A (8B) searches for the server 8B (8A) on the other network for device searching is enabled (S610: YES), control proceeds to step S620 where the server 8A (8B) transmits a search request message (see FIG. 7B) to the server 8B (8A) on the other network as a unicast packet. Then, the server 8A (8B) receives a response message (see FIG. 7C) transmitted from the other network (step S630).

Next, server 8A (8B) extracts device information form the received response message to obtain the search result of device information generated by the server 8B (8A) on the other network, and stores the search result in the HDD 84 (step S640). The server 8A (8B) thus searches for network devices on the other network and obtains the device information of the network devices on the other network.

If the requested device information is not know information (step S650: NO) or if all of the devices of which device information is know are on its own network (S660: YES), the server 8A (8B) terminates the other network information response process because in this case the terminal device which transmitted the search packet has already received the device information on the inside network of the terminal device and therefore it is unnecessary to transmit the same device information from the server 8A (8B) to the terminal device. After the other network information response process is terminated, control returns to step S430 of FIG. 12.

Referring back to FIG. 12, if the received packet is not a search packet transmitted by the terminal device 6A (6B) on its own network A (B) (450: NO), control proceeds to step S460 where the server 8A (8B) judges whether received packet is an advertisement message (see FIG. 7A) transmitted from the server 8B (8A) on the other network.

If the received packet is an advertisement message (see FIG. 7A) transmitted from the server 8B (8A) on the other network (S460: YES), control proceeds to step S470 where the server 8A (8B) executes a process (storing the new device information in the HDD 84 or deleting the device information of the network device which is already off the network) depending on the type of the received advertisement packet. After thus updating the device information in the HDD 84, the server 8A (8B) extracts an advertisement packet from the received advertisement message, and sends out the advertisement packet to its own network as a multicast packet (step S480). Then, control returns to step S430.

If the received packet is not an advertisement message transmitted from the server 8B (8A) on the other network (S460: NO), control proceeds to step S490 where the server 8A (8B) judges whether the received packet is a search request message (see FIG. 7B) transmitted from the server 8B (8A) on the other network. If the received packet is a search request message transmitted from the server 8B (SA) on the other network (S490: YES), control proceeds to step S500 where the server 8A (8B) extracts device information of devices corresponding to devices types described in the received message from the device information on devices on its own network, and transmits the extracted device information, as a response message (see FIG. 7C), to the server 8B (8A) on the other network. After step S500 is finished, control returns to step S430.

If the received packet is not a search request message transmitted from the server 8B (8A) on the other network (S490: NO), control proceeds to step S510 where the server 8A (8B) judges whether the received packet is a message indicating addition of a server (see FIG. 14C) transmitted from the server 8B (8A) on the other network.

If the received packet is not a message for addition of a server (S510: NO), control returns to step S430. If the received packet is a message for addition of a server (S510: YES), control proceeds to step S520 where the server 8A (8B) judges whether an IP address and a port number of a server to be added described in the received message have already been stored in the HDD 84 as device information of a server on the other network.

If an IP address and a port number of a server to be added described in the received message have already been stored in the HDD 84 (S520: YES), control returns to step S430. If an IP address and a port number of a server to be added described in the received message have not been stored in the HDD 84 (S520: NO), the server 8A (8B) control proceeds to step S530.

In step S530, the server 8A (8B) stores registers the IP address and the port number of the added server in the HDD 84 as information on a server (hereafter, referred to as server information) which is newly connected to its own network via the router 2 on from the other network.

After thus newly registering the server information in the HDD 84, the server 8A (83) notifies servers on the other network other than the newly added server of the server information of the newly added server (step S540). Then, control returns to step S420. The notification of the server information of the newly added server is achieved by using a message indicating addition of a server shown in FIG. 14C.

If it is judged in step S430 that the packet is not received (S430: NO), control proceeds to step S550 where the server 8A (8B) compares the current time with the time information associated with device information for each pieces of device information to judge whether expired device information exist in the HDD 84. If expired device information is found n the HDD 84 (S550: YES), control proceeds to step S560 where the server 8A (8B) deletes the expired device information form the HDD 84. Then, control proceeds to step S445 to notify the server 8B (8A) on the other network of the fact that the expired device information is deleted form the HDD 84.

As described above, the network device 4A (4B) is configured to repeatedly transmit the advertisement packet in a period shorter than the available period assigned to the advertisement packet (e.g., 1800 seconds). Therefore, if the device information of which available period is expired exists in the HDD 84, the server 8A (8B) is able to judge the device corresponding to such device information to be already off the network and to delete such device information from the HDD 84. The server 8A (8B) is also able to notify the server on the other network of the information indicating the device of which device information is expired is already off the network.

If expired device information is not found in the HDD 84 (S550: NO), the server 8A (8B) judges whether a server on the other network is newly registered in the server 8A (8B) by a user through the input interface 85 (e.g., a keyboard and a mouse) (step S570). If a device is newly registered by a user manually (S570: YES), the server 8A (8B) obtains the server information (e.g., an IP address and a port number) of the newly registered server, and notifies the newly registered server of its own server information (e.g., an IP address and a port number).

After notifying the newly registered server of the server information, the server 8A (8B) adds the server information of the newly registered server to the HDD 84 (step S530), and notifies other servers of the information of the newly registered server (step S540). Then, control returns to step S420.

As described above, in the network system 1, an information collecting server which collects device information of network devices on its own network though use of a multicast packet is provided in each of networks (e.g., the networks A and B), while a device in one network is allowed to communicate with a device on the other network only by a unicast packet through routers (e.g., the routers 2A and 2B). An information collecting server on a network is able to obtain device information on devices on the other network by communicating with a device on the other network by unicast.

After acquiring the device information on devices on the other network, the information collecting server notifies terminal devices on its own network of the collected device information by multicast. If the information collecting server receives a request for device information from the terminal device on its own network by multicast, the information collecting server notifies the terminal device (which transmitted the request) of the device information on devices on the other network.

Therefore, according to the network system 1, it is possible to share network devices such as a printer, a scanner and a facsimile device between more than one network, and to provide device information used to share the network devices from a device in a network to a terminal device on the other network.

The terminal device 6A (6B) receives the advertisement packet from the server 8A (8B) on its own network by multicast or receives sends out a search packet to its own network by multicast, so that the terminal device 6A (6B) can obtain device information on network devices on the other network from the server.

Therefore, the terminal device 6A (6B) is able to obtain the device information on available network devices on its own network or on the other networks without considering differences between more than one network. It is not necessity for the terminal device 6A (6B) to output various types of signals to obtain device information on devices on its own network and on the other network.

According to the network system 1, devices outputting advertisement packets and search packets in accordance with UPNP can be used as the devices 4A and 4B and terminal devices 6A and 6B. Therefore, it is possible to accomplish a network system in which network devices are shared between more than on network at inexpensively and easily.

The server 8A (8B) not only provides device information for the server on the other network or the terminal device on its own network in response to a request for device information from the server on the other network or from the terminal device on its own network, the server 8A (8B), but also provides device information for the server on the other network or the terminal device on its own network when the server 8A (8B) obtains the device information on devices on its own network. Therefore, the server 8A (8B) is able to provide desired device information for the server on the other network or the terminal device on its own network.

In the network system 1, device information to be provided from the server 8A (8B) to the terminal device on its own network is limited to information on devices on the other network. Such a configuration prevents the server 8A (8B) from outputting device information on devices on the network A when the network device 4A (4B) provides the device information to the terminal device in response to the search packet transmitted by the terminal device by multicast. Therefore, according to the embodiment, unnecessary data (packets) can be prevented from increasing and flowing through each network.

In the network system 1, the server 8A monitors the status of the device. If the device is already off the network, and the server 8A (8B) deletes the device information of the device from the HDD 84, and notifies the server on the other network of the fact that the device is already off the network. Therefore, if the network device 4A (4B), of which device information has been provided for the other network, breaks away from the network, the server 8A notifies the other network of the fact that the network device 4A (4B) is already off the network. Such a configuration enables the server 8A (8B) to cause the server on the other network to delete the device information of the network device which is already off the network.

In the network system 1, it is possible to set server information on server on a network to a server on the other network by manually inputting the server information to only one server on one of the networks. Such a configuration simplifies an operation for setting server information. That is, the server 8A (8B) registers the server information in the HDD 84 when the server information of a new server is manually inputted by a user. Then, the server 8A (8B) notifies the server on the other network of the device information of the new server. In addition, the server 8A (8B) notifies the new server of its own server information. With this configuration, it is possible to easily register, in a server on a network, server information on a server on the other network.

Although the present invention has been described in considerable detail with reference to certain preferred embodiments thereof, other embodiments are possible.

In the above mentioned embodiment, the information collecting server is provided for each of the networks (i.e., the networks A and B), and each information collecting server provide device information on device on its own network for the other information collecting servers on the other networks. That is, the device information is exchanged between information collecting servers.

However, the network system may be configured such that only one information collecting server is provided in the network system. In this case, the information collecting server provided in one of the networks in the system performs one-to-one communication with each of network devices on the other networks to obtain the device information of the network devices on the other networks, and then provides the obtained device information to the terminal device on its own network. With this configuration, the same advantages as those provided by the above mentioned embodiment can be achieved.

In the above mentioned embodiment, the server 8A (8B) returns the device information on only devices on its own network in response to the search request (see S500 in FIG. 12). However, in addition to returning the device information on devices on its own network, the server 8A (8B) may return the device information on devices on the other network.

In the above mentioned embodiment, messages exchanged between the servers are formed as plain text. However, messages exchanged between the servers may be encrypted for retaining a high level of security.

For one-to-one communication between servers, each server does not necessarily have an address of a destination server. With this configuration, if each router is provided with an address exchange function such as a NAT (Network Address Translation) or an IP masquerade function, transmission data output form one server can be transmitted to another server through the router.

What is claimed is:

1. A first server provided in a network system in which a router intervenes between different networks to allow at least one device on the different networks to perform one-to-one communication, the first server comprising:
    a first device information acquisition unit configured to perform one-to-one communication with a second server on a second network connected to a first network to which the first server is connected via the router to acquire device information concerning a second device on the second network, and to store the acquired device information in a storage unit; and
    a device information reply unit configured such that in response to receipt of a search packet searching for device information transmitted in a form of one-to-many communication from a terminal device on the first network, the device information reply unit extracts from the storage unit the device information, which matches a search criterion contained in the search packet and which is obtained from the second server on the second network, and returns the extracted device information to the terminal device on the first network which transmitted the search packet.

2. The first server according to claim 1, further comprising:
    a second device information acquisition unit configured to acquire device information on devices on the first network through the one-to-many communication, and stores the acquired device information on devices on the first network in the storage unit; and
    a device information providing unit configured to perform the one-to-one communication with an information server on the second network to provide the device information on devices on the first network stored in the storage unit for the information server.

3. The first server according to claim 2, wherein the device information providing unit provides the device information on devices on the first network for the information server on the second network each time the second device information acquisition unit is notified of the device information from the terminal device on the first network.

4. The first server according to claim 3, wherein each device on its own network notifies the first or second server of the device information in the one-to-many communication repeatedly at predetermined time intervals;

the first server further comprising:

a device information deletion unit configured such that if the device information on the terminal device on the first network is not obtained within the predetermined time interval, the device information deletion unit deletes the device information on the terminal device, of which device information is not received within the predetermined time interval, from the storage unit, wherein, each time the device information deletion unit deletes the device information form the storage unit, the device information providing unit provides information, indicating that the device information on the terminal device of which device information is not received within the predetermined time interval is deleted, for the information server on second network.

5. The first server according to claim 2, wherein:

at least one selected device on the first network returns its device information in response to receipt of the search packet from a device in the first network transmitted in the form of one-to-many communication; and in response to receipt of the search packet, the device information reply unit selects the device information matching the search criterion contained in the search packet and returns the selected device information to the at least one selected device which transmitted the search packet.

6. The server according to claim 2, further comprising:

a first address information obtaining unit configured to obtain address information on the information server on the second network, the address information being inputted externally, an address information notification unit configured to perform one-to-one communication with the information server in accordance with the address information obtained by the first address information obtaining unit to notify the information server of the first server's address information;

a second address information obtaining unit configured to perform one-to-one communication with the information server to obtain address information on the information server; and an address information setting unit configured such that if the first address information obtaining unit or the second address information obtaining unit obtains the address information on the information server on the second network, the address information setting unit sets the obtained address information as an address to be used by the first device information acquisition unit and the device information providing unit in one-to-one communication.

7. A method of providing device information from a first server to at least one first device on the a first network, the device information concerning at least one second device on a second network, the method comprising the steps of:

performing one-to-one communication with a second server on the second network connected to the first network via a router to acquire the device information on the at least one second device on the second network;

storing the acquired device information in a storage unit;

in response to receipt of a search packet searching for device information transmitted in a form of one-to-many communication on the first network, extracting the device information, from the storage unit, which matches a search criterion contained in the search packet and which is obtained from the second server on the second network; and returning the extracted device information to the at least one first device on the first network, which transmitted the search packet.

8. A non-transitory computer readable medium having computer readable instructions stored thereon, which, when executed by a first server connected to a first network, are configured to:

perform one-to-one communication with a second server on a second network connected to the first network via a router to acquire device information on the device on the second network;

store the acquired device information in a storage unit;

extract device information, from the storage unit, which matches a search criterion contained in a search packet in response to receipt of the search packet searching for device information transmitted in a form of one-to-many communication on the first network and which is obtained from the second server on the second network; and return the extracted device information to a terminal device on the first network, which transmitted the search packet.

9. A network system, comprising:

a router which intervenes between different networks in the network system to allow at least one first or second device on the different networks to perform one-to-one communication therethrough; and a first server provided in a first network, wherein the first server comprises:

a first device information acquisition unit configured to perform one-to-one communication with a second server on a second network connected to the first network to which the first server is connected via the router to acquire device information concerning the at least one second device on the second network, and to store the acquired device information in a storage unit; and a device information reply unit configured such that in response to receipt of a search packet searching for device information transmitted in a form of one-to-many communication from the at least one first device on the first network, the device information reply unit extracts from the storage unit the device information which matches a search criterion contained in the search packet and which is obtained from the second server on the second network, and returns the extracted device information to the at least one first device on the first network which transmitted the search packet.

10. The network system according to claim 9, wherein the server further comprises:

a second device information acquisition unit configured to acquire device information on devices on the first network through the one-to-many communication, and stores the acquired device information on devices on the first network in the storage unit; and a device information providing unit configured to perform the one-to-one communication with an information server on the second network to provide the device information on devices on the first network stored in the storage unit for the information server.

11. A method for sharing a device in a network system in which a router intervenes between different networks to allow at least one device on the different networks to perform one-to-one communication, the method comprising the steps of:

performing, on a first server connected on a first network of the different networks, one-to-one communication with a second server on a second network connected to the first network via the router to acquire device information on the shared device on the second network;

storing, on the first server, the acquired device information in a storage unit;

extracting, on the first server, the device information which matches a search criterion contained in a search packet in response to receipt of the search packet searching for device information transmitted in a form of one-to-many communication on the first network from the shared device on the first network and which is obtained from a second server on the second network,;

returning the extracted device information from the one of the first and the second server to the shared device which transmitted the search packet; and receiving, on the shared device on the first network, the device information transmitted from the second server after the shared device on the first network transmits the search packet.

* * * * *